United States Patent [19]
Allmendinger

[11] 3,968,624
[45] July 13, 1976

[54] CONNECTOR FIXTURE
[75] Inventor: Jackson G. Allmendinger, Wayne, Mich.
[73] Assignee: Unistrut Corporation, Wayne, Mich.
[22] Filed: July 1, 1975
[21] Appl. No.: 592,113

[52] U.S. Cl. .............................. 52/758 F; 403/363; 403/284; 403/388; 52/758 D
[51] Int. Cl.² ........................................... F16B 7/00
[58] Field of Search ........... 403/363, 375, 388, 284, 403/285, 274; 52/758 F, 758 D, 584

[56] References Cited
UNITED STATES PATENTS
1,980,154  11/1934  Coe .............................. 403/375 UX
3,312,443  4/1967  Levigne ........................ 403/363 X
3,408,665  11/1968  Harris ........................... 403/363 X FOREIGN PATENTS OR APPLICATIONS
515,486  12/1939  United Kingdom ................ 403/363

Primary Examiner—Wayne L. Shedd
Attorney, Agent, or Firm—Peter Xiarhos; Elmer J. Nealon; Norman J. O'Malley

[57] ABSTRACT

A connector fixture for joining a first structural member to a second structural member. The second structural member includes a central bore and a pair of lug receiving apertures disposed at a predetermined distance on opposite sides of the central bore. The first structural member includes a central bore adapted to register with the central bore of the second structural member and in addition has a pair of outwardly extending lugs which register with and are received in the lug receiving apertures in the second structural member, thereby properly positioning the first and second structural members relative to each other. A connector, such as a bolt and nut, is then inserted through the central bore of the first and second structural members to clamp the members together. The lug is circular and comprises one or more raised segments, wherein the outer periphery of the raised segment is dimensioned to fit closely adjacent to at least a portion of the inner surface of one of the lug receiving apertures in said second structural member.

6 Claims, 6 Drawing Figures

CONNECTOR FIXTURE

BACKGROUND OF THE INVENTION

1. Field of the Invention

The present invention relates generally to connector fixtures and more particularly to such fixtures provided with an improved construction for a lug utilized to properly align a first structural member to a second structural member.

2. Description of the Prior Art

A connector fixture for joining a first structural member to a second structural member wherein one of the structural members includes lugs which are received into bores on the other structural member are well known and widely adopted in the trade. For example, such a connector fixture is disclosed in U.S. Pat. No. 3,421,280 entitled "Building Construction" and issued to Charles W. Attwood on Jan. 14, 1969 and owned by the Assignee of this application. This fixture has proved to be of particular utility in modular space frame systems as shown in the aforementioned U.S. Pat. No. 3,421,280.

The lugs on the connector fixtures serve a two fold purpose. First, the lugs serve to automatically align the first structural member to the second structural member, thereby permitting not only an easy and rapid assembly of the connector fixture but also a more accurate alignment of the structural members relative to each other than is obtainable by more conventional connector fixtures. Connector fixtures employing lugs thus not only reduce construction time, and hence construction costs, but also eliminate the necessity of tapes, protractors and the like which were previously necessary to properly align the structural members.

Secondly, connector fixtures employing lugs provide a rigid structural assembly while utilizing only a single fastener. In previously known connector fixtures without lugs, at least two bolts or the like were required in order to prevent one structural member from pivoting relative to the other structural member around the axis of the fastener. Since fasteners, such as nuts and bolts, are relatively expensive to purchase and time consuming to install, additional savings are realized by utilizing connector fixtures with lugs.

The previously known connector fixtures employing lugs have been simple in structure, typically comprising a pair of circular coined lugs in the first structural member and a pair of lug receiving recesses or apertures in the second structural member. Due to the coining operation, the abstract surface of the previously known lugs, i.e. the surface of the lug which abuts against the inner surface of the lug receiving aperture, is somewhat conical in shape. In addition, registering apertures were provided in each structural member to receive a fastener therethrough. Thus, the fastener and the lugs created a three point attachment between the structural members, thereby preventing the first structural member from pivoting relative to the second structural member around the axis of the fastener.

Connector fixtures with lugs have enjoyed wide acceptance in the trade. However, it has been found that with the previously known connector fixtures with lugs, when a torque of high magnitude is applied to the two structural members, tending to produce a pivotal motion around the fastener, the previously known coined lug has had a tendency to slip out of its receiving aperture. After the lug has escaped from its receiving aperture, the effectiveness of the connector fixture is effectively destroyed.

SUMMARY OF THE PRESENT INVENTION

The connector fixture of the present invention overcomes the above mentioned disadvantages of the previously known connector fixtures with lugs by providing an improved construction for the lug capable of resisting a greater torque force around the axis of the fastener than has heretofore been possible. The lug of the present invention is formed in the structural member by cutting a semi-circular segment through one of the structural members. The segment is then deformed, preferably by stamping, so that it is raised above the surface of the structural member. The lug as described above thus forms a semi-cylindrical abutment surface rather than the conical surface of the previously known lugs which protrudes above the surface of the structural member.

The connector fixture of the present invention includes a first structural member having a pair of the above described lugs and a connector aperture. The second structural member includes a connector aperture adapted to register with the connector aperture of the first structural member and a pair of lug receiving apertures adapted to receive the lugs on the first structural member therein. When the structural members are placed together, a connector, such as a bolt and a nut, is inserted through the registering connector apertures and tightened and the first structural member is locked to the second structural member. The semi-cylindrical abutment surface of the lug member abuts against the inner surface of the lug receiving aperture in the second construction member whenever a torque force is applied between the structural members, thereby preventing one construction member from pivoting relative to the other structural member. The connector fixture of the present invention is able to withstand comparatively larger torque forces than the previously known connector fixtures since the semi-cylindrical surface of the lug, unlike the previously known lugs with conical surfaces, prevents the lug from slipping out from the lug receiving aperture on the second structural member.

Alternatively, two semi-circular segments may be formed in the structural member, each of which is deformed to rise above the surface of the structural member. Where the lug of the present invention comprises two raised segments, rather than one, the segments are necessarily smaller.

BRIEF DESCRIPTION OF THE DRAWINGS

The connector fixture of the present invention will be more clearly understood by reference to the following detailed description when read in conjunction with the accompanying drawing wherein like reference characters refer to like parts throughout the several views, and in which.

DETAILED DESCRIPTION OF THE PRESENT INVENTION

Figure 1:
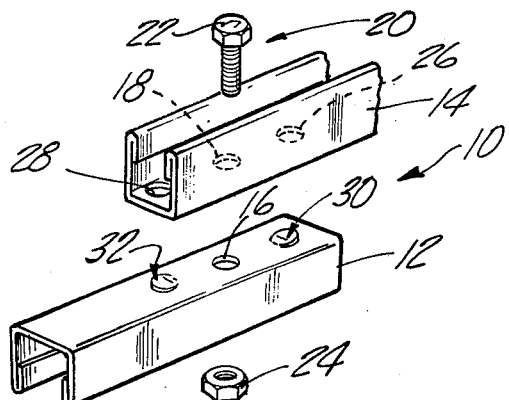
FIG. 1 is an exploded perspective view showing the connector fixture of the present invention.
Figure 6:
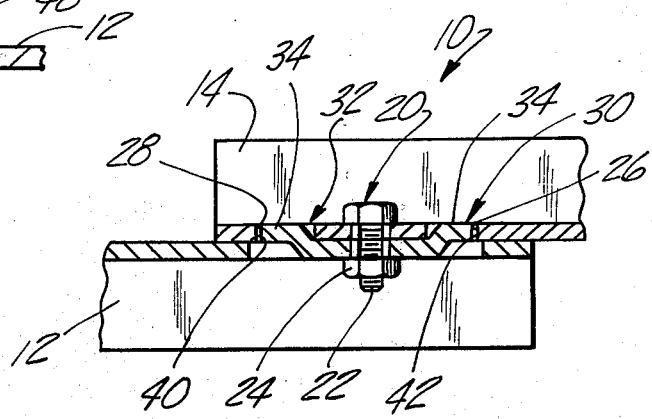
FIG. 6 is a cross-sectional view of the assembled connector fixture of the present invention.

Referring to FIGS. 1 and 6, the connector fixture 10 of the present invention is shown securing a first structural member 12 to a second structural member 14. Although the structural members 12 and 14 are shown as comprising elongated members, it will be realized that the structural members 12 or 14 may take any convenient form such as the struts shown or a connector fixture and a strut as shown in the previously mentioned patent to Attwood. Registering apertures 16 and 18 are provided through the structural members 12 and 14, respectively, and are adapted to receive a connector or fastener 20 therethrough for securing the structural members 12 and 14 together. The connector or fastener 20 may be of any conventional type, such as a bolt 22 and a nut 24.

The second structural member 14 also includes a pair of lug receiving apertures 26 and 28 disposed on opposite sides of connector aperture 18. The apertures 26 and 28 are preferably equidistantly spaced from the aperture 18 for versatility of construction as will become hereinafter apparent.

Figure 2:
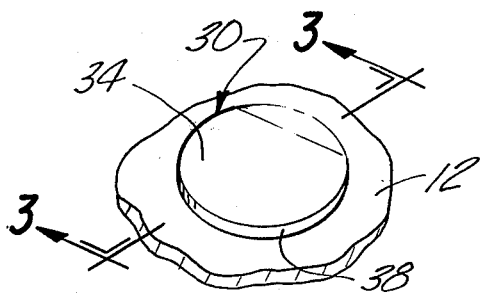
FIG. 2 is a perspective view showing the improved lug of the connector fixture of the present invention and enlarged for clarity.
Figure 3:
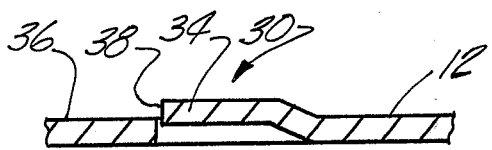
FIG. 3 is a cross-sectional view taken along line 3—3 of FIG. 2.

The first structural member 12 includes two lugs 30 and 32 which register with the apertures 26 and 28, respectively, in the second structural member 14. The lug 30 is substantially identical to the lug 32 and thus, for brevity, only a single lug 30 will be described in detail. Referring now to FIGS. 2 and 3 where the lug 30 is shown and enlarged for clarity, the lug 30 comprises a substantially semi-circular segment 34 with a diameter substantially the same or slightly less than the diameter of the aperture 26 in the structural member 14. As best shown in FIG. 3, the segment 34 is raised above the surface 36 of the structural member 12 so that the outer periphery of the segment 34 forms a generally semi-cylindrical surface 38. The segment 34 is preferably formed by a single stamping operation as is well known in the art, although any conventional metal forming method may be used without deviating from the spirit of the present invention. Also, as previously mentioned, the lug 32 is formed in substantially the same manner as the lug 30.

Referring now to FIG. 6, it can be seen that with the connector 20 securing the first structural member 12 to the second structural member 14, the segments 34 of the lugs 30 and 32 register with and are received in the apertures 26 and 28, respectively, of the second structural member 14. Since the diameter of the segments 34 are substantially the same, or slightly smaller than the diameter of the aperture 26 or 28, the semi-cylindrical surface 38 of the segments 34 lies closely adjacent to the cylindrical inner surfaces 40 and 42 of the apertures 26 and 28. In this manner, the lugs 30 and 32 serve a two fold purpose. First, when the lugs 30 and 32 are properly received within the apertures 26 and 28, respectively, the first structural member 12 is automatically aligned with the second structural member as has been heretofore described.

Secondly, the lugs 30 and 32 prevent any pivotal motion of the structural members 12 and 14 relative to each other around the axis of the connector 20 in the following manner: A torque force on the fixture 10 will cause the semi-cylindrical surface 38 of the lugs 30 and 32 to abut against the cylindrical surfaces 40 and 42, respectively, of the apertures 26 and 28, thereby preventing any pivotal motion of the structural member 12 relative to the member 14. It has been found that the lugs 30 and 32 of the present invention are capable of withstanding a greater torque load on the connector fixture than are capable with the lugs of the previously known connector fixtures. The previously known lugs have typically comprised circular coined projections so that the outer periphery or abutment surface of the lugs was conical in shape. Thus, when a large torque force was applied to connector fixtures with the previously known lugs, the second structural member 14 had a tendency to deform and ride up along the conical surface of the lugs, until the lugs escaped from their receiving apertures. The semi-cylindrical upper surface 38 of the segments 34 of the present invention obviates this disadvantage since there is no tendency for the structural member to deform and ride along the semi-cylindrical surface.

Figure 4:
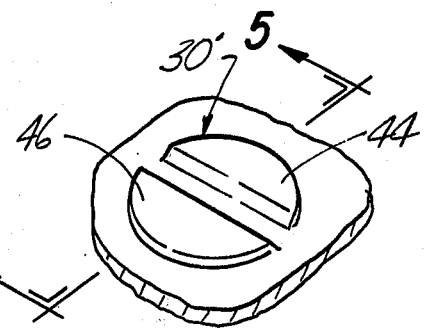
FIG. 4 is a view similar to FIG. 2 but showing a modification thereof.
Figure 5:
FIG. 5 is a cross-sectional view taken along line 5—5 of FIG. 4.

A modified lug 30' is illustrated in FIGS. 4 and 5. Unlike the single segment 34 of the lug 30, the lug 30' comprises two smaller back-to-back segments 44 and 46 thereinstead. Each segment 44 and 46 is shaped as a circle segment somewhat smaller than a semi-circle and like the segment 34 the radii of the segments 46 and 44 is substantially the same or slightly less than the radius of the aperture 26 or 28. As shown in FIG. 5, the segments 44 and 46 are raised above the surface 36 of the structural member 12, preferably by stamping, so that the outer periphery 48 and 50 of the segments 44 and 46 respectively form semi-cylindrical surfaces. The segments 44 and 46 of the lug 30' are received in the aperture 26 in the structural member 14 in substantially the same manner as the segment 34 of the lug 30. Likewise, the lug 30' functions in substantially the same manner as the already described lug 30 and, for brevity, such operation will not be here repeated.

It can thus be seen that the connector fixture of the present invention with the improved lug construction enjoys substantial advantages unknown to previously known connector fixtures with lugs. It should also be apparent that many modifications of the present invention will become apparent to those skilled in the art to which it pertains without deviating from the spirit of the invention as defined by the scope of the appended claims.

What is claimed is:

1. A connector fixture comprising:
   a first structural member having a central bore formed therethrough and a pair of lugs formed thereon, said lugs being formed on opposite sides of said central bore;
   a second structural member having a central bore in register with said central bore of said first structural member and having a pair of lug receiving apertures formed therethrough which register with and receive said lugs of said first structural member therein; and
   a connector inserted through said registering central bores of said first and second structural members clamping said first structural member to said second structural member, wherein each of said lugs comprises a segment having a generally-flat, thin, first portion generally parallel to the surface of the first structural member and having an exposed edge surface generally normal to the surface of the first structural member, and a second portion between the first structural member and the first portion and supporting the first portion in a cantilever-like fashion above and spaced from the surface of the first structural member, said segment being fitted within a corresponding one of said lug receiving apertures in said second structural member.

2. The connector fixture as defined in claim 1 wherein said segment is formed as a circle segment, and wherein said lug receiving aperture is round and has substantially the same diameter as said segment.

3. The connector fixture as defined in claim 2 wherein the outer periphery of said segment is semi-cylindrical.

4. A connector fixture comprising:
- a first structural member having a central bore formed therethrough and a pair of lugs formed thereon, said lugs being formed on opposite sides of said central bore;
- a second structural member having a central bore in register with said central bore of said first structural member and having a pair of lug receiving apertures formed therethrough which register with and receive said lugs of said first structural member therein; and
- a connector inserted through said registering central bores of said first and second structural members clamping said first structural member to said second structural member, wherein each of said lugs comprises a pair of back-to-back segments having generally-flat, thin, first portions generally parallel to the surface of the first structural member and having exposed edge surfaces generally normal to the surface of the first structural member, and second portions between the first structural member and the first portions and supporting the first portions in a cantilever-like fashion above and spaced from the surface of the first structural member, said pair of segments being fitted within a corresponding one of said lug receiving apertures in said second structural member.

5. The connector fixture as defined in claim 4 wherein said segments are formed as back-to-back circle segments, and wherein said lug receiving aperture is round and has substantially the same diameter as said segments.

6. The connector fixture as defined in claim 4 wherein the outer peripheries of said back-to-back segments are semi-cylindrical.

* * * * *